United States Patent [19]

Nakamura

[11] Patent Number: 5,335,176
[45] Date of Patent: Aug. 2, 1994

[54] SAFETY SYSTEM FOR VEHICLES
[75] Inventor: Masahide Nakamura, Osaka, Japan
[73] Assignee: Koyo Seiko Co., Ltd., Osaka, Japan
[21] Appl. No.: 982,664
[22] Filed: Nov. 30, 1992
[30] Foreign Application Priority Data
Dec. 2, 1991 [JP] Japan .................................. 3-99284
[51] Int. Cl.⁵ .............................................. B62D 5/00
[52] U.S. Cl. ................................ 364/424.05; 280/748
[58] Field of Search ............. 364/424.05, 566, 571.07; 280/748

[56] References Cited

U.S. PATENT DOCUMENTS

| 4,410,154 | 10/1983 | Matty | 246/182 B |
| 4,773,012 | 9/1988 | Ito et al. | 364/424.01 |
| 5,018,070 | 5/1991 | Eguchi | 364/424.05 |
| 5,122,954 | 6/1992 | Okono | 364/424.05 |

FOREIGN PATENT DOCUMENTS

| 0444772 | 1/1991 | European Pat. Off. |
| 444772A2 | 9/1991 | European Pat. Off. |
| 2835942 | 3/1980 | Fed. Rep. of Germany |
| 3606797 | 9/1987 | Fed. Rep. of Germany |
| 2591960 | 12/1986 | France |
| 58-137765 | 4/1983 | Japan |
| 2066538 | 7/1981 | United Kingdom |

Primary Examiner—Thomas G. Black
Assistant Examiner—Julie D. Day
Attorney, Agent, or Firm—Mason, Fenwick & Lawrence

[57] ABSTRACT

A safety system for vehicles comprises a sensor for detecting steering angles, a sensor for detecting speeds of the vehicle, a sensor for detecting lateral accelerations of the vehicle, and a discriminating unit having a table wherein the relationships between vehicle speeds and lateral accelerations are classified for each of different ranges of steering angles into a safety region and a hazardous region with respect to the state of the vehicle. The discriminating unit is adapted to judge the state of the vehicle from the results of detection by the respective sensors with reference to the table and to give an alarm to the driver when the state of the vehicle has come out of the safety region into the hazardous region.

2 Claims, 4 Drawing Sheets

SAFETY SYSTEM FOR VEHICLES

BACKGROUND OF THE INVENTION

The present invention relates to safety systems for vehicles.

With increases in the speed of motor vehicles in recent years, more frequent traffic accidents occur due to overspeeds along curves to pose social problems. Heretofore known as safety systems for preventing traffic accidents due to overspeeding of motor vehicles are those adapted to give an alarm when the speed of vehicles has exceeded a predetermined hazardous speed, whereas traffice accidents due to overspeeding at curves can not be precluded merely by giving alarms.

SUMMARY OF THE INVENTION

An object of the present invention is to provide a safety system for vehicles which is capable of preventing traffic accidents due to overspeeding at curves.

The safety system of the present invention for vehicles comprises steering angle detecting means, speed detecting means, means for detecting lateral accelerations of the vehicle, and discriminating means having a table wherein the relationships between vehicle speeds and lateral accelerations are classified for each of different ranges of steering angles into a safety region and a hazardous region with respect to the state of the vehicle, the discriminating means being adapted to judge the state of the vehicle from the results of detection by the respective detecting means with reference to the table and to give an alarm to the driver when the state of the vehicle has come out of the safety region into the hazardous region.

Preferably, the discriminating means is adapted to brake the vehicle when the state of the vehicle in the hazardous region has become greater than previously in the degree of hazard. In this case, the discriminating means stores an initial degree of hazard upon the state of the vehicle coming out of the safety region into the hazardous region and recognizes that the current degree of hazard has become greater than previously when exceeding the initial degree of hazard.

The state of the vehicle can be expressed by the steering angle, the speed of the vehicle and the lateral acceleration of the vehicle. When the discriminating means is provided with the table wherein the relationships between vehicle speeds and lateral accelerations are classified for different ranges of steering angles into a safety region and a hazardous region with respect to the state of the vehicle, the state of the vehicle can be judged from the steering angle, vehicle speed and lateral acceleration detected, with reference to this table. The discriminating means gives an alarm to the driver when the vehicle state has come out of the safety region into the hazardous region, thereby urging the driver to keep the safety speed. This obviates accidents due to overspeeding at curves.

When the state of the vehicle in the hazardous region has become greater than previously in the defree of hazard, the vehicle is braked, whereby such accidents can be precluded more reliably.

DESCRIPTION OF THE PREFERRED EMBODIMENT

An embodiment of the invention will be described below with reference to the accompanying drawings.

Figure 1:
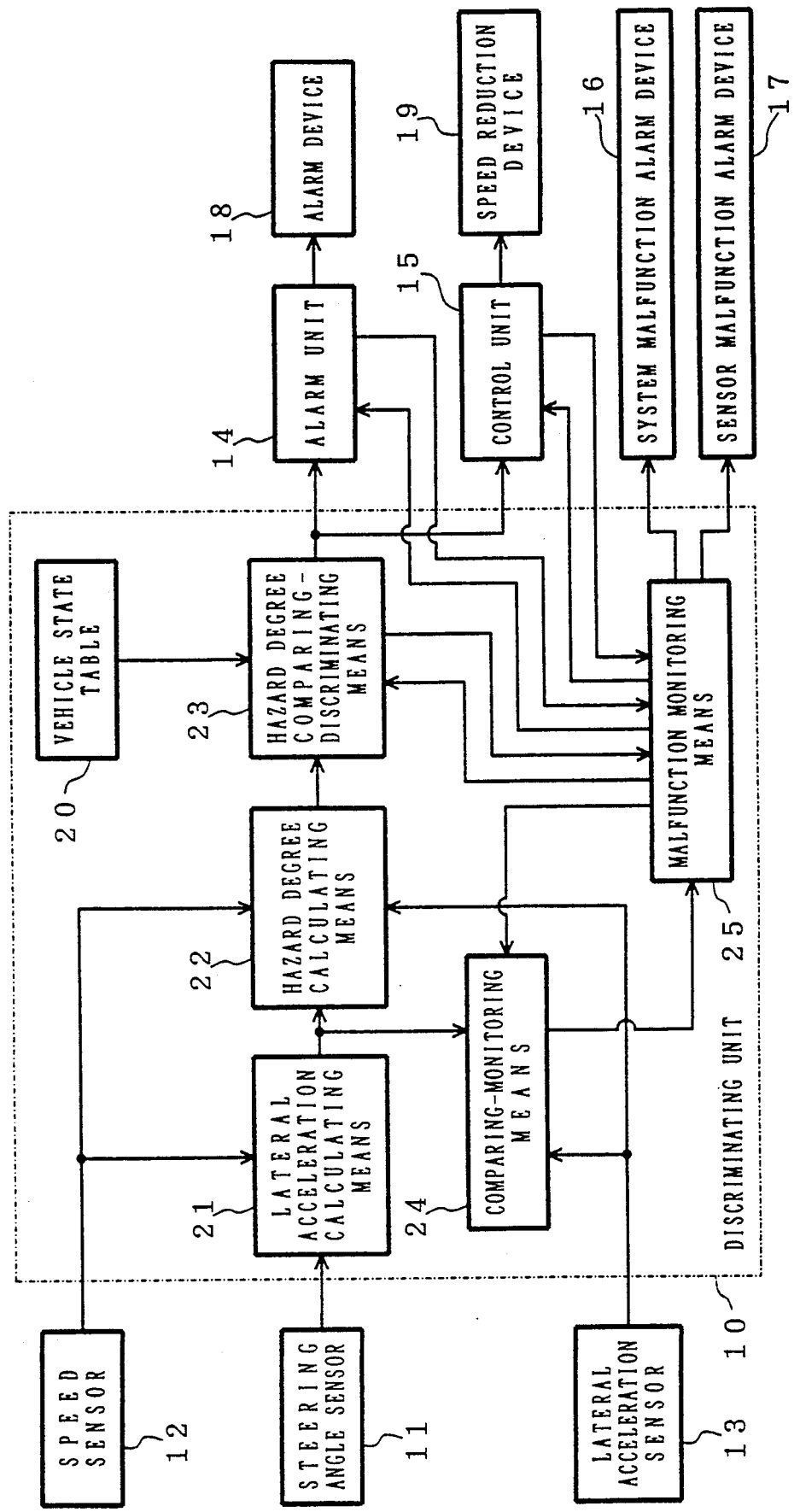
FIG. 1 is a block diagram showing a safety system embodying the invention for use in vehicles.

FIG. 1 shows the overall construction of a safety system for vehicles.

Referring to FIG. 1, a discriminating unit 10 serving as discriminating means has connected thereto a steering angle sensor 11 as steering angle detecting means, a speed sensor 12 as means for detecting the speed of the vehicle, a lateral acceleration sensor 13 as means for detecting the lateral acceleration of the vehicle, an alarm unit 14, a control unit 15, a system malfunction alarm device 16 and a sensor malfunction alarm device 17. An alarm device 18 is connected to the alarm unit 14, and a speed reduction device 19 to the control unit 15.

The discriminating unit 10 comprises a microcomputer and includes a vehicle state table 20, lateral acceleration calculating means 21, hazard degree calculating means 22, hazard degree comparing-discriminating means 23, comparing-monitoring means 24 and malfunction monitoring means 25. The steering angle sensor 11 detects a steering angle $\theta$, from which the lateral acceleration calculating means 21 first calculates the turning angle $\theta 40$ of the vehicle using the following equation (1).

$$\theta' = A \cdot \theta \cdot \frac{\pi}{180} \tag{1}$$

wherein A is a constant. The calculating means 21 then time-differentiates the angle $\theta'$ by the following equation (2) to determine the angular velocity $\omega$ of the vehicle.

$$\omega = \frac{d\theta'}{dt} = \frac{\pi \cdot A}{180} \cdot \frac{d\theta}{dt} \tag{2}$$

The lateral acceleration calculating means 21 further calculates the lateral acceleration Gr of the vehicle from the vehicle speed v detected by the speed sensor 12 and the angular velocity $\omega$ using the following equation (3).

$$Gr = v \cdot \omega = A \cdot \frac{\pi}{180} \cdot v \cdot \frac{d\theta}{dt} \tag{3}$$

Figure 2:
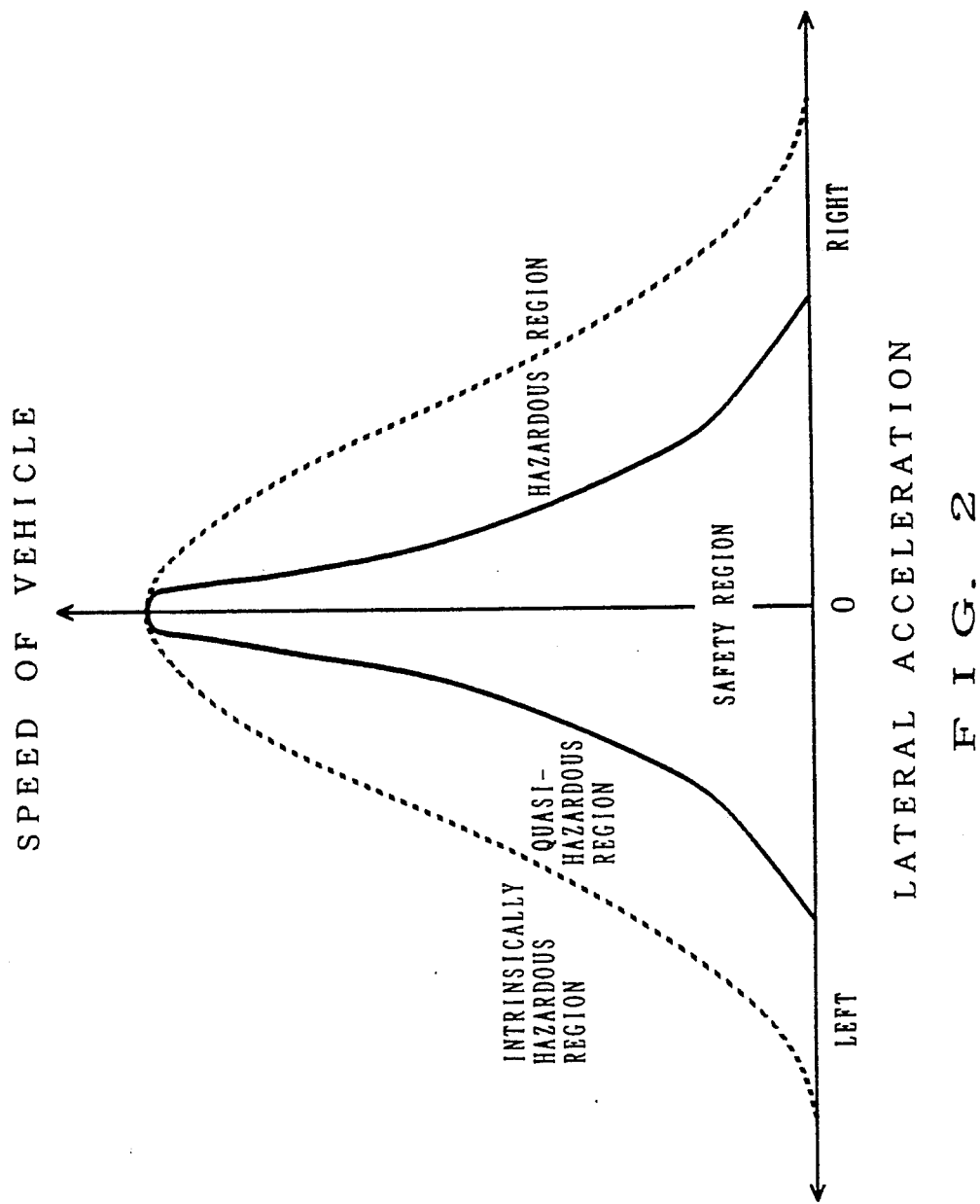
FIG. 2 is a graph which shows states of a vehicle as divided into a saftey region and a hazardous region for specified ranges of steering angles and in which the lateral acceleration of the vehicle is plotted as abscissa vs. the speed of the vehicle as ordinate.

Tabulated in the vehicle state table 20 are the relationships between vehicle speeds and lateral accelerations, as classified for each of different ranges of steering angles into a safety region and a hazardous region with respect to the state of the vehicle. FIG. 2 shows an example of classification of safety regions and hazardous regions serving as a basis for the tabulation. The diagram represents the states of the vehicle in specified ranges of steering angles with the lateral acceleration plotted as abscissa against the speed as ordinate. The origin O is the point where the lateral acceleration and the speed are zero. The abscissa represents leftward lateral accelerations on the left side of the origin O, and rightward lateral accelerations on the right side thereof. The lateral acceleration increases with an increase in the distance from the origin O on either side. The speed increases with an increase in the upward distance from the origin O. The areas inside the solid line in which the lateral acceleration and the speed are both small and which include the origin 0 are safety regions. The areas outside the solid line are hazardous regions. The hazardous region is divided into a quasi-hazardous region adjacent to the safety region and inside the broken line, and an intrisically hazardous region outside the broken line. The intrisically hazardous region is an area beyond the ability of the vehicle.

The alarm device 18 gives an alarm to the driver with light and/or sound and is controlled by the alarm unit 14 in response to an output from the hazard degree comparing-discriminating means 23 of the discriminating unit 10. The system malfunction alarm device 16 and the sensor malfunction alarm device 17 are controlled with an output from the malfunction monitoring means 25 of the discriminating unit 10. The speed reduction device 19 is a device which can be steered, such as a brake equipped with antiskid means (ABS), and is controlled by the control unit 15 in response to an output from the hazard degree comparing-discriminating means 23 of the unit 10.

Figure 3:
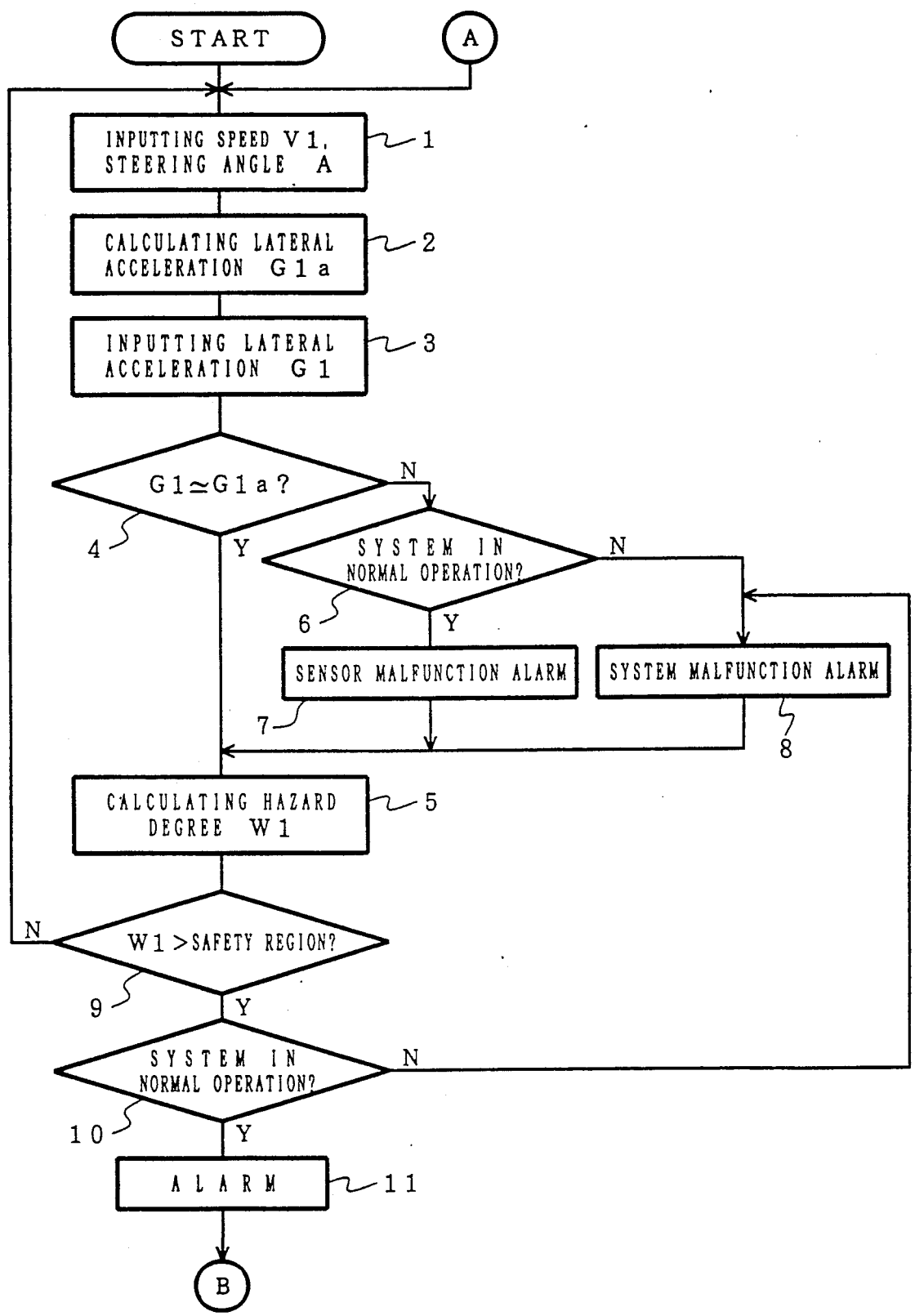
FIG. 3 is a flow chart showing the former half of the process to be executed by a discriminating unit.
Figure 4:
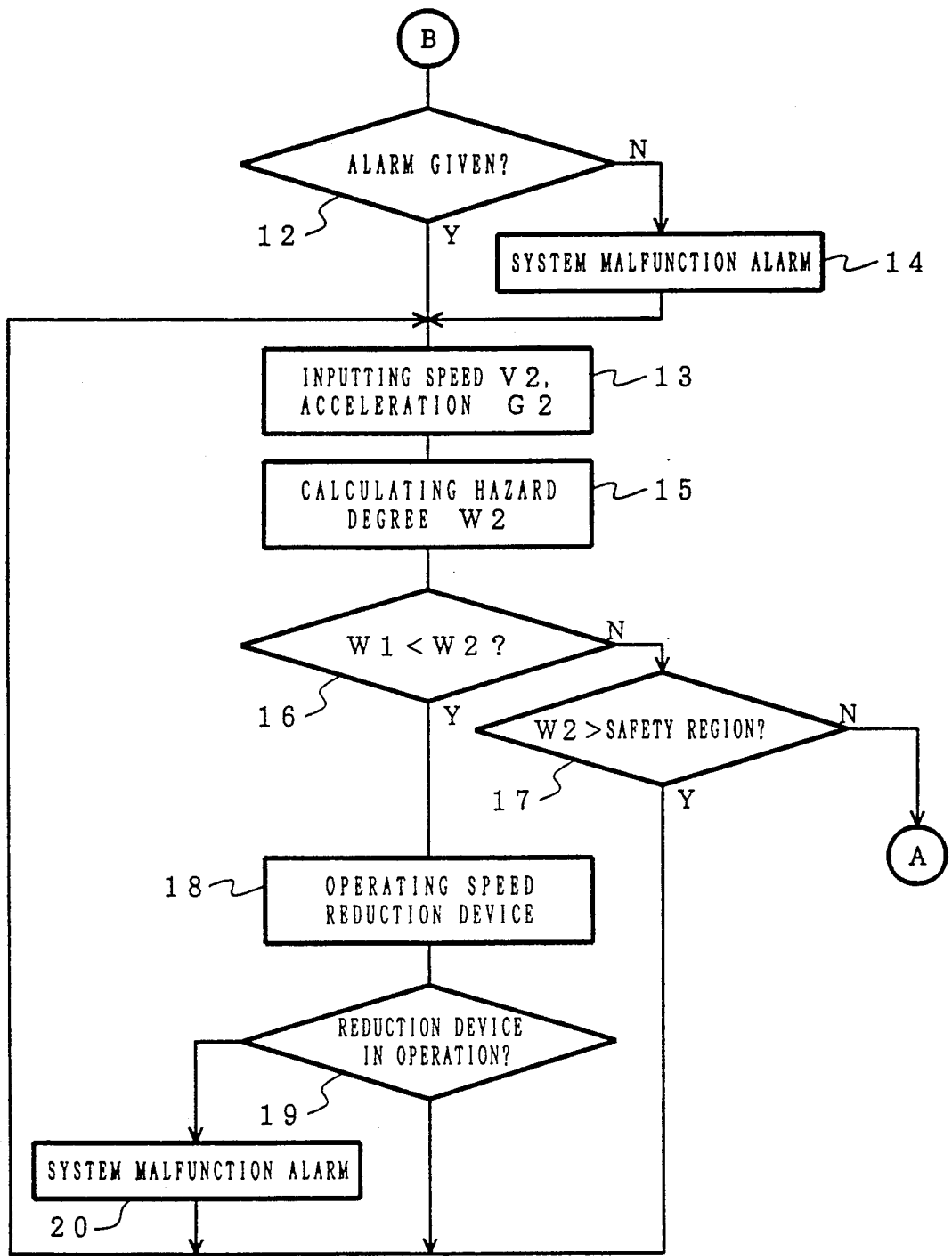
FIG. 4 is a flow chart showing the latter half of the process.

Next, an example of process to be executed by the discriminating unit 10 will be described with reference to the flow charts of FIGS. 3 and 4.

First, the speed sensor 12 and the steering angle sensor 11 input a speed V1 and steering angle A to the unit 10 (step 1), which calculates a lateral acceleration Gla of the vehicle from these inputs (step 2). More specifically, this calculation is performed by the lateral acceleration calculating means 21. Next, the lateral acceleration sensor 13 feeds a lateral acceleration G1 to the comparing-monitoring means 24 (step 3), which compares the input value of lateral acceleration (detected value) G1 with the calculated value Gla of lateral acceleration to check whether these values are approximately equal (step 4) and to thereby detect a break or like failure of the acceleration sensor 13. When G1 nearly equals Gla, the sequence proceeds to step 5, in which a hazard degree W1 is calculated by the hazard degree calculating means 22. The hazard degree is expressed, for example, by a combination of lateral acceleration and speed. If G1 is not found to be approximately equal to Gla in step 4, step 6 follows in which the malfunction monitoring means 25 checks whether the system is operating normally based on monitoring, for example, by a watchdog timer. When the system is in normal operation, the sequence proceeds to step 7, in which the sensor malfunction alarm device 17 is driven to give a sensor malfunction alarm, followed by step 5. If the system is not found normal in step 6, the sequence proceeds to step 8, in which the system malfunction alarm device 16 is driven to give a system malfunction alarm, followed by step 5. Upon completion of calculation of the hazard degree W1 in step 5, the sequence proceeds to step 9 to check whether the hazard degree W1 is beyond the safety region, i.e., whether the degree is in the hazardous region. This checking is done by the hazard degree comparing-discriminating means 23 with reference to the data included in the vehicle state table 21 and corresponding to the current steering angle A, by recognizing the particular region of the table where the hazard degree W1, as expressed by the combination of speed V1 and lateral accceleration input value G1, is present. When the hazard degree W1 is in the safety region, the sequence returns to step 1, and the procedure of steps 1 to 5 and 9 is repeated insofar as the system or the sensors are free of malfunctioning.

If the hazard degree W1 is found in the hazardous region in step 9, step 10 follows. Thus, it is when the hazard degree comes out of the safety region into the hazard region that the sequence proceeds from step 9 to step 10. The hazard degree W1 in this instance will be referred to as the "hazardous region initial hazard degree." Step 10, like step 6, inquires whether the system is in normal operation. If the answer is negative, step 8 follows again. When the system is found in normal operation in step 10, the sequence proceeds to step 11, in which the alarm unit 14 drives the alarm device 18 to give the driver an alarm with light and sound. An inquiry is then made as to whether the alarm has been given properly (step 12). When the answer is in the affirmative, step 13 follows. If otherwise, step 14 follows to give a system malfunction alarm as in step 8. The sequence thereafter proceeds to step 13, in which the speed sensor 12 and the lateral acceleration sensor 13 input a speed V2 and lateral acceleration G2 to the unit 10. As in step 5, a hazard degree W2 is then calculated from the speed V2 and lateral acceleration G2 (step 15). An inquiry is made as to whether the hazard degree W2 is greater than the hazardous region initial hazard degree W1 (step 16). When step 16 has revealed that the hazard degree W2 currently calculated is not greater than the initial hazard degree W1, step 17 follows to check whether W2 is beyond the safety region. If this degree is in the hazardous region, the sequence returns to step 13. In the case where the driver has taken a measure such as a speed reduction in response to an alarm given upon the state of the vehicle coming out of the safety region into the hazard region, it is likely that the hazard degree W2 will be smaller than the initial hazard degree W1. In such a case, steps 13 and 15 to 17 are repeated until the vehicle state returns to the safety region, whereupon the sequence returns from step 17 to step 1 to repeat the foregoing process. When the hazard degree W2 currently calculated is found to be greater than the initial hazard degree W1 in step 16, step 18 follows, causing the control unit 15 to operate the speed reduction device 19 and brake the vehicle. An inquiry is then made as to whether the speed reduction device 19 has operated normally (step 19). If the answer is affirmative, the sequence returns to step 13. If otherwise, step 20 follows to give a system malfunction alarm as in step 8, whereupon the sequence returns to step 13. When the vehicle state comes out of the safety region into the hazardous region, it is likely that the hazard degree W2 will become further greater than the initial hazard degree W1. In such a case, steps 13, 15, 16, 18 and 19 are repeated to hold the vehicle braked by the speed reduction device 19 until W2 decreases to not greater than W1 insofar as the system is free of malfunctioning. Upon W2 decreasing to not greater than W1, the sequence proceeds from step 16 to step 17 to relieve the vehicle of the braking operation by the speed reduction device 19. Steps 13 and 15 to 17 are repeated until the vehicle state returns to the safety region, whereupon the sequence returns from step 17 to step 1 to repeat the foregoing process as previously stated.

What we claim is:

1. A safety system for vehicles comprising a steering angle detecting means, a means for detecting speeds of the vehicle, a means for detecting lateral accelerations of the vehicle, and a discriminating means having a table wherein the relationships between vehicle speeds and lateral accelerations are classified for each of different ranges of steering angles into a safety region and a hazardous region with respect to the state of the vehicle, the discriminating means being adapted to judge the state of the vehicle from the results of detection by the respective detecting means with reference to the table and to give an alarm to the driver when the state of the vehicle has come out of the safety region into the hazardous region, the discriminating means storing an initial degree of hazard upon the state of the vehicle coming out of the safety region into the hazardous region and recognizing that the current degree of hazard has become greater than previously when exceeding the initial degree of hazard, the discriminating means controlling a speed reduction device to brake the vehicle when the state of the vehicle in the hazardous region has become greater than previously in the degree of hazard.

2. The safety system for vehicle as defined in claim 1 which further comprises a lateral acceleration calculating means for calculating the lateral acceleration of the vehicle from the result of the detection by the steering angle detecting means and the result of detection by the vehicle speed detecting means.

* * * * *